(12) United States Patent  
Kanakadass et al.

(10) Patent No.: US 12,332,370 B2  
(45) Date of Patent: Jun. 17, 2025

(54) RADAR SYSTEM WITH INTERFERENCE MITIGATION

(71) Applicant: NXP B.V., Eindhoven (NL)

(72) Inventors: Vinodh Kanakadass, Bangalore (IN); Dayananda Kuderu Siddarajappa, Bangalore (IN)

(73) Assignee: NXP B.V., Eindhove (NL)

( * ) Notice: Subject to any disclaimer, the term of this patent is extended or adjusted under 35 U.S.C. 154(b) by 287 days.

(21) Appl. No.: 17/812,220

(22) Filed: Jul. 13, 2022

(65) Prior Publication Data

US 2024/0019535 A1   Jan. 18, 2024

(51) Int. Cl.
| | |
|---|---|
| G01S 7/02 | (2006.01) |
| G01S 13/58 | (2006.01) |
| G01S 13/931 | (2020.01) |
| G01S 7/28 | (2006.01) |
| G01S 7/36 | (2006.01) |
| G01S 7/41 | (2006.01) |

(52) U.S. Cl.
CPC .............. G01S 7/023 (2013.01); G01S 13/58 (2013.01); G01S 13/931 (2013.01); G01S 7/02 (2013.01); G01S 7/2813 (2013.01); G01S 7/36 (2013.01); G01S 7/41 (2013.01); G01S 7/411 (2013.01)

(58) Field of Classification Search
CPC ........ G01S 7/023; G01S 13/58; G01S 13/931; G01S 7/2813; G01S 7/02; G01S 7/36; G01S 7/41; G01S 7/411
See application file for complete search history.

(56) References Cited

U.S. PATENT DOCUMENTS

| | | |
|---|---|---|
| 3,981,014 A | 9/1976 | Masak |
| 5,515,378 A | 5/1996 | Roy, III et al. |
| 2003/0179136 A1* | 9/2003 | Kohno ................... H01Q 21/08 342/360 |
| 2012/0092211 A1* | 4/2012 | Hampel ................ G01S 13/762 342/175 |

(Continued)

FOREIGN PATENT DOCUMENTS

CN        113933792 A  *  1/2022

OTHER PUBLICATIONS

C. Aydogdu et al: "RadChat: Spectrum Sharing for Automotive Radar Interference Mitigation," in IEEE Transactions on Intelligent Transportation Systems, Dec. 25, 2019, pp. 416-429.

(Continued)

*Primary Examiner* — Vladimir Magloire  
*Assistant Examiner* — Ismaaeel A. Siddiquee

(57) ABSTRACT

A radio detection and ranging (radar) system includes various antennas and a controller. The antennas receive an interfering radio wave in an operating beamwidth of the radar system. The operating beamwidth is divided into a plurality of sectors. The controller determines a direction-of-arrival and a power level of the interfering radio wave. Further, the controller determines a power level of received signal energy within each sector of the plurality of sectors, and selects, from the plurality of sectors, a set of sectors such that a power level of received signal energy within each sector of the set of sectors is less than a threshold value of the corresponding sector. The controller then broadcasts another radio wave within the selected set of sectors to mitigate the interference of the interfering radio wave.

20 Claims, 3 Drawing Sheets

(56) References Cited

U.S. PATENT DOCUMENTS

| | | | | |
|---|---|---|---|---|
| 2016/0124086 A1* | 5/2016 | Jansen | .................. | G01S 13/931 |
| | | | | 342/107 |
| 2019/0137600 A1* | 5/2019 | Bilik | ....................... | G01S 7/023 |
| 2020/0136250 A1* | 4/2020 | Cohen | ....................... | G01S 7/03 |
| 2020/0309933 A1* | 10/2020 | Ray | ....................... | G01S 13/282 |
| 2021/0341598 A1* | 11/2021 | Sahara | .................. | G01S 13/931 |
| 2022/0003834 A1* | 1/2022 | Iwasa | ..................... | G01S 7/285 |
| 2023/0104935 A1* | 4/2023 | Chang | .................... | G01S 7/415 |
| | | | | 342/128 |

OTHER PUBLICATIONS

C. Fischer et al: "Robust detection and mitigation of mutual interference in automotive radar," 2015 16th International Radar Symposium (IRS), Dresden, 2015, pp. 143-148.

S. Ishikawa, et al: "Packet-based FMCW Radar using CSMA Technique to Avoid Narrowband Interefrence," 2019 International Radar Conference (RADAR), Toulon, France, Sep. 23-27, 2019, pp. 1-5.

* cited by examiner

RADAR SYSTEM WITH INTERFERENCE MITIGATION

FIELD OF USE

The present disclosure relates generally to electronic circuits, and more particularly, to a radio detection and ranging (radar) system with interference mitigation.

BACKGROUND

Radio detection and ranging (radar) systems are widely used in vehicles to detect objects (such as other vehicles, pedestrians, or the like) that are in the vicinity of the vehicles. A radar system broadcasts a radio wave that is reflected from an object. Based on the reflected and broadcasted radio waves, the radar system detects the object and determines various parameters (such as a distance, a direction, a velocity, or the like) of the object with respect to the radar system. Such radar systems typically operate in a fixed frequency range (e.g., 77 gigahertz (GHz) to 81 GHz). When multiple radar systems are in proximity of each other, a radio wave broadcasted by one radar system may result in interference for another radar system. Such interference leads to inaccurate determination of parameters of objects, and in turn, to events such as collisions.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
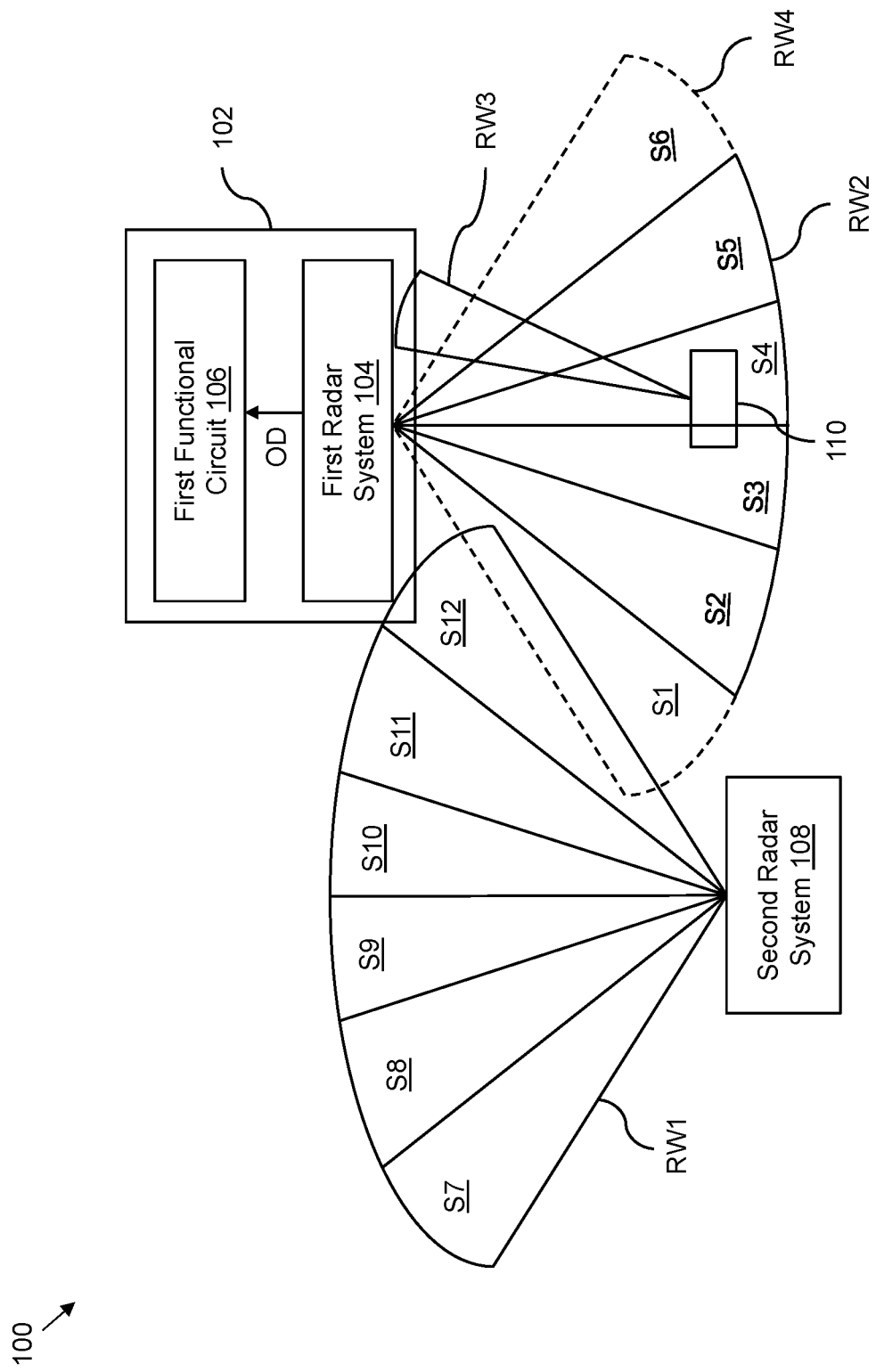
FIG. 1 illustrates a schematic block diagram of a radio detection and ranging (radar) network in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, a radio detection and ranging (radar) system is disclosed. The radar system may include a first plurality of antennas and a controller that may be coupled to the first plurality of antennas. The first plurality of antennas may be configured to receive a first radio wave in an operating beamwidth of the radar system. The operating beamwidth may be divided into a plurality of sectors. The controller may be configured to determine a direction-of-arrival and a power level of the first radio wave. Based on the direction-of-arrival and the power level of the first radio wave, the controller may be further configured to determine a power level of received signal energy within each sector of the plurality of sectors. Further, the controller may be configured to select, from the plurality of sectors, a first set of sectors such that a power level of received signal energy within each sector of the first set of sectors is less than a threshold value of the corresponding sector. The first set of sectors includes fewer than all of the plurality of sectors. The controller may be further configured to broadcast a second radio wave within only the first set of sectors.

In another embodiment of the present disclosure, a method for interference mitigation in a radar system is disclosed. The method may include receiving a first radio wave in an operating beamwidth of the radar system by a first plurality of antennas of the radar system. The operating beamwidth may be divided into a plurality of sectors. The method may further include determining a direction-of-arrival and a power level of the first radio wave by a controller of the radar system. Further, the method may include determining a power level of received signal energy within each sector of the plurality of sectors by the controller based on the direction-of-arrival and the power level of the first radio wave. The method may further include selecting a first set of sectors from the plurality of sectors by the controller. The first set of sectors may be selected such that a power level of received signal energy within each sector of the first set of sectors is less than a threshold value of the corresponding sector. The first set of sectors includes fewer than all of the plurality of sectors. The method may further include broadcasting a second radio wave within only the first set of sectors by the controller.

In some embodiments, the controller may include a first processing circuit. The first processing circuit may be configured to receive first status data that is indicative of the direction-of-arrival and the power level of the first radio wave. Further, the first processing circuit may be configured to process the first status data and determine the power level of received signal energy within each sector of the plurality of sectors based on the processing of the first status data. The first processing circuit may be further configured to select the first set of sectors from the plurality of sectors and generate second status data indicative of the first set of sectors.

In some embodiments, the controller may further include an interference measurement circuit that may be coupled to the first processing circuit. The interference measurement circuit may be configured to receive a first digital signal that is derived from the first radio wave. Based on the first digital signal, the interference measurement circuit may be further configured to determine the direction-of-arrival and the power level of the first radio wave. Further, the interference measurement circuit may be configured to generate the first status data.

In some embodiments, the controller may further include a low pass filter that may be configured to receive the first radio wave and generate a first filtered signal as a filtered version of the first radio wave. The controller may further include an analog-to-digital converter that may be coupled to the low pass filter and the interference measurement circuit. The analog-to-digital converter may be configured to receive the first filtered signal and generate the first digital signal as a digital version of the first filtered signal.

In some embodiments, the controller may further include a precoder that may be coupled to the first processing circuit. The precoder may be configured to receive the second status data from the first processing circuit and convert the second status data to a set of precoded values to adjust the operating beamwidth of the radar system.

In some embodiments, the controller may further include a chirp generator that may be configured to generate a chirp signal. The controller may further include a beam generator that may be coupled to the precoder and the chirp generator. The beam generator may be configured to receive the set of precoded values from the precoder and the chirp signal from the chirp generator. Based on the set of precoded values and the chirp signal, the beam generator may be further configured to broadcast the second radio wave within the first set of sectors to mitigate an interference of the first radio wave.

In some embodiments, the radar system may further include a second plurality of antennas that may be coupled to the controller. The controller may broadcast the second radio wave using the second plurality of antennas.

In some embodiments, the controller may be further configured to receive a third radio wave using the first plurality of antennas. The third radio wave may correspond to the second radio wave that is reflected from an object that is in a vicinity of the radar system. The controller may be further configured to determine, based on the third radio wave and the second radio wave, a distance, a direction, and a velocity of the object with respect to the radar system.

In some embodiments, the controller may include a mixer that may be coupled to the first plurality of antennas. The mixer may be configured to receive the third radio wave and a chirp signal that is utilized in the broadcast of the second radio wave. The mixer may be further configured to generate, based on the third radio wave and the chirp signal, a control signal that may be indicative of a time duration between the broadcast of the second radio wave and the reception of the third radio wave.

In some embodiments, the controller may further include a chirp generator that may be coupled to the mixer. The chirp generator may be configured to generate the chirp signal and provide the chirp signal to the mixer. The chirp signal is generated for the broadcast of the second radio wave.

In some embodiments, the controller may further include a low pass filter that may be coupled to the mixer. The low pass filter may be configured to receive the control signal from the mixer, and generate a second filtered signal as a filtered version of the control signal. The controller may further include an analog-to-digital converter that may be coupled to the low pass filter. The analog-to-digital converter may be configured to receive the second filtered signal from the low pass filter, and generate a second digital signal as a digital version of the second filtered signal. The controller may further include a second processing circuit that may be coupled to the analog-to-digital converter. The second processing circuit may be configured to receive the second digital signal from the analog-to-digital converter, process the second digital signal, and determine the distance, the direction, and the velocity of the object with respect to the radar system based on the processing of the second digital signal.

In some embodiments, a frame associated with the radar system may be divided into a first phase and a second phase. During the first phase, the controller determines the direction-of-arrival and the power level of the first radio wave and the power level of received signal energy within each sector of the plurality of sectors, and selects the first set of sectors from the plurality of sectors. Further, during the second phase, the controller broadcasts the second radio wave within the first set of sectors.

In some embodiments, when the second radio wave is broadcasted for a predefined number of frames associated with the radar system, the controller may be further configured to broadcast, during a subsequent frame, a fourth radio wave within the plurality of sectors.

In some embodiments, the first set of sectors is spatially contiguous.

In some embodiments, the plurality of sectors may include the first set of sectors and a second set of sectors. The second set of sectors may include first and second sectors that are associated with and distant from each other. A power level of received signal energy within at least one of a group consisting of the first and second sectors is greater than or equal to an associated threshold value.

Conventionally, to mitigate (e.g., reduce or eliminate) interference, a radio detection and ranging (radar) system checks for the interference prior to broadcasting the radio waves and if the interference is detected, the radar system halts the broadcast of the radio waves. Implementation of such an interference mitigation technique by the radar system may lead to a failure in an object detection operation if the interference persists for a significant time duration. Further, the aforementioned interference mitigation technique is implemented in time and frequency domains. Typically, such implementation includes various transformation operations that result in a significant increase in the design complexity of the radar system.

Various embodiments of the present disclosure disclose a radar system that may include various antennas and a controller. The antennas may receive an interfering radio wave in an operating beamwidth of the radar system. The operating beamwidth may be divided into a plurality of sectors. The controller may determine a direction-of-arrival and a power level of the interfering radio wave. Based on the direction-of-arrival and the power level of the interfering radio wave, the controller may further determine a power level of received signal energy within each sector of the plurality of sectors. Further, the controller may select, from the plurality of sectors, a set of sectors such that a power level of received signal energy within each sector of the selected set of sectors is less than a threshold value of the corresponding sector. The controller may then broadcast a trimmed radio wave within the selected set of sectors to mitigate the interference of the interfering radio wave.

Thus, when the presence of the interfering radio wave is detected, the controller of the radar system of the present disclosure broadcasts the trimmed radio wave to mitigate the interference. This is in contrast to the conventional interference mitigation technique where the broadcast of radio waves is halted when the interference is detected. As a result, the reliability of object detection in an interference mitigation technique implemented by the radar system of the present disclosure is significantly greater than that in the conventional interference mitigation technique. Further, the controller detects the interference in a spatial domain and mitigates the interference in the spatial domain by reducing the beamwidth of the broadcasted radio wave. Thus, the interference mitigation technique implemented by the radar system of the present disclosure is sans transformation operations. As a result, the design complexity of the radar system of the present disclosure is significantly less than that of a radar system that implements the conventional interference mitigation technique.

FIG. 1 illustrates a schematic block diagram of a radio detection and ranging (radar) network 100 in accordance with an embodiment of the present disclosure. The radar network 100 may include first electronic circuitry 102. The first electronic circuitry 102 may include a first radar system 104 and a first functional circuit 106 that may be coupled to the first radar system 104. The radar network 100 may further include a second radar system 108 and a second functional circuit (not shown) that may be coupled to the second radar system 108. Further, the second radar system 108 and the second functional circuit may be included in second electronic circuitry (not shown). In an embodiment, the first electronic circuitry 102 and the second electronic circuitry may be implemented in first and second vehicles (not shown), respectively.

Each of the first and second radar systems 104 and 108 may transmit and receive radar signals within an electromagnetic beam that has an operating beamwidth. A beam axis of the electromagnetic beam extends perpendicularly from the corresponding radar system. As used herein, the operating beamwidth (also referred to as a "beam diameter") of the electromagnetic beam corresponds to a width of the electromagnetic beam, along a specified line or arc that is perpendicular to and intersects the beam axis. In an embodiment, the operating beamwidth may be in a range of 20 degrees to 180 degrees. However, the operating beamwidth may be narrower or wider in various other embodiments. The operating beamwidth may be divided into various sectors. As used herein, a sector of the operating beamwidth refers to one of a plurality of non-overlapping but adjacent portions of the beamwidth. In an embodiment, each sector of the operating beamwidth has a sector width, which is in a range of 5 degrees to 20 degrees. However, each sector width may be narrower or wider in various other embodiments.

In the present disclosure, the first radar system 104 and the second radar system 108 transmit and receive radar signals within electromagnetic beams having a first operating beamwidth and a second operating beamwidth, respectively. The first operating beamwidth may be divided into a first plurality of sectors, and the second operating beamwidth may be divided into a second plurality of sectors. For the sake of ongoing discussion, it is assumed that the first plurality of sectors includes first through sixth sectors S1-S6 and the second plurality of sectors includes seventh through twelfth sectors S7-S12. The first and second pluralities of sectors are hereinafter referred to as the "first plurality of sectors S1-S6" and the "second plurality of sectors S7-S12", respectively. It is further assumed that the first operating beamwidth and the second operating beamwidth intersect or overlap in space, either permanently (e.g., when the first and second vehicles are stationary) or temporarily (e.g., when the first and second vehicles are moving with respect to each other). For example, as illustrated in FIG. 1, the first sector S1 of the first operating beamwidth and the twelfth sector S12 of the second operating beamwidth spatially overlap. Further, each of the first and second radar systems 104 and 108 may be configured to broadcast various radio waves having one or more corresponding sectors that are contiguous (i.e., adjacent in space). For example, the second radar system 108 may be configured to broadcast a first radio wave RW1 within the second plurality of sectors S7-S12 to the radar network 100.

The first radar system 104 may be configured to receive the first radio wave RW1 in the first operating beamwidth. Further, the first radar system 104 may be configured to determine a direction-of-arrival and a power level of the first radio wave RW1. Based on the direction-of-arrival and the power level of the first radio wave RW1, the first radar system 104 may be further configured to determine a power level of received signal energy within each sector of the first plurality of sectors S1-S6. Non-zero power levels of received signal energy within one or more sectors of the first plurality of sectors S1-S6 are indicative of a presence of an interfering radio wave (e.g., the first radio wave RW1) in the first operating beamwidth.

The first plurality of sectors S1-S6 includes various sector pairs, where each pair includes two sectors that are offset symmetrically from the beam axis (i.e., a line between the third and fourth sectors S3 and S4, which extends perpendicularly from the first radar system 104). For example, the first and sixth sectors S1 and S6 are associated with each other and form one sector pair. Similarly, the second and fifth sectors S2 and S5 are associated with each other and form another sector pair, whereas the third and fourth sectors S3 and S4 are associated with each other and form yet another sector pair.

Each sector of the first plurality of sectors S1-S6 has a threshold value, which is stored in a lookup table in a memory (not shown) of the first electronic circuitry 102. The threshold value of each sector is indicative of a minimum power level of an interfering radio wave (or "received signal energy") that may affect an object detection operation in the corresponding sector. The first through sixth sectors S1-S6 have first through sixth threshold values (not shown), respectively. In an example, the first through sixth threshold values are equal. In another example, the first through sixth threshold values are unequal. In yet another example, the first and sixth threshold values (i.e., for the sector pair including the first and sixth sectors S1 and S6) are equal to a first value. Similarly, the second and fifth threshold values (i.e., for the sector pair including the second and fifth sectors S2 and S5) are equal to a second value that is different from the first value. Further, the third and fourth threshold values (i.e., for the sector pair including the third and fourth sectors S3 and S4) are equal to a third value that may be different from the first value and/or the second value. In an example, the first through sixth threshold values may range from −148 decibel-milliwatts (dBm) to −104 dBm. However, the range of the first through sixth threshold values may be different in various other embodiments.

The first radar system 104 may be further configured to retrieve the first through sixth threshold values from the memory, and compare the power levels of received signal energy within the first through sixth sectors S1-S6 with the first through sixth threshold values, respectively. Further, the first radar system 104 may be configured to select, from the first plurality of sectors S1-S6, a first set of sectors (e.g., fewer than all of the first plurality of sectors S1-S6) such that a power level of received signal energy within each sector of the first set of sectors is less than a threshold value of the corresponding sector. The first set of sectors includes contiguous sectors in space, in an embodiment. A second set of sectors (e.g., remaining sectors) of the first plurality of sectors S1-S6 is thus not selected.

The unselected sectors (e.g., the second set of sectors) include at least two sectors that are associated with each other (e.g., a sector pair) and distant from each other (e.g., not adjacent to each other). Further, a power level of received signal energy within at least one sector is greater than or equal to an associated threshold value (e.g., a threshold value for the corresponding sector stored in the memory). In other words, the second set of sectors includes one or more sector pairs with a power level of received signal energy within at least one sector of each sector pair being greater than or equal to an associated threshold value.

In the aforementioned example, as the first radio wave RW1 broadcasted by the second radar system 108 in the twelfth sector S12 overlaps with (e.g., is received in) the first sector S1, the power level of received signal energy within the first sector S1 may be greater than or equal to the first threshold value for the first sector S1. In such a scenario, if the power level of received signal energy within the first sector S1 is greater than or equal to the first threshold value, the first sector S1 is not selected by the first radar system 104 for a subsequent object detection operation. Further, as the sixth sector S6 forms the sector pair with the first sector S1, the sixth sector S6 is not selected even if the power level of received signal energy within the sixth sector S6 is less than the sixth threshold value for the sixth sector S6. Thus, the second set of (unselected) sectors may include the first and sixth sectors S1 and S6. The rejection (e.g., non-selection) of a sector pair even if exclusively one sector in the sector pair has a power level of received signal energy greater than or equal to the associated threshold value is to ensure the accuracy of the object detection operation and reduce the design complexity of the first radar system 104. In an alternate embodiment, however, the first radar system 104 may only unselect sectors in which the power level of received signal energy is greater than or equal to the associated threshold value (e.g., the threshold value for that sector stored in the memory), and may select all sectors in which the power level of received signal energy is less than the associated threshold value.

The first set of (selected) sectors may consequently include the second through fifth sectors S2-S5. In other words, the power levels of received signal energy within the second through fifth sectors S2-S5 are less than the second through fifth threshold values, respectively. Those of skill in the art would understand, based on the description herein, that if interference is detected in additional sectors (e.g., the second sector S2), the first set of sectors may not include the second and fifth sectors S2 and S5. For example, the first set of sectors may include the third and fourth sectors S3 and S4, or some other subset of sectors.

The first radar system 104 may be further configured to generate and broadcast a second radio wave RW2 such that the second radio wave RW2 is propagated within the first set of sectors (e.g., the second through fifth sectors S2-S5), but not within the non-selected first and sixth sectors S1 and S6. The selection of the first set of sectors in an aforementioned manner ensures that the second radio wave RW2 is symmetrical. Further, as illustrated in FIG. 1, the first set of sectors is spatially contiguous. The first radar system 104 broadcasts the second radio wave RW2 to the radar network 100 to mitigate the interference of the first radio wave RW1. The broadcast of the second radio wave RW2 (e.g., a radio wave with reduced beamwidth) prevents interference with various radar systems (e.g., the second radar system 108) in the radar network 100. For example, as the second radio wave RW2 is a trimmed radio wave (e.g., a radio wave broadcasted in a narrower beamwidth), the second radio wave RW2 does not interfere with the first radio wave RW1. As a result, the operations of the first and second radar systems 104 and 108 are not affected by the overlap in the first operating beamwidth and the second operating beamwidth.

The radar network 100 may further include an object 110 (e.g., another vehicle, a pedestrian, a barricade, or the like) present in the vicinity of the first radar system 104 (e.g., the first vehicle). The second radio wave RW2 broadcasted by the first radar system 104 may be reflected from the object 110. The second radio wave RW2 that is reflected from the object 110 is hereinafter referred to as a "third radio wave RW3". The first radar system 104 may be further configured to receive the third radio wave RW3. Based on the received third radio wave RW3 and the broadcasted second radio wave RW2, the first radar system 104 may be further configured to determine a distance, a direction, and a velocity of the object 110 with respect to the first radar system 104. The first radar system 104 may be further configured to generate object data OD that is indicative of the distance, the direction, and the velocity of the object 110 with respect to the first radar system 104.

The first radar system 104 performs the above-mentioned operations during multiple consecutive frames associated therewith. Each frame may be divided into a first phase and a second phase, each of which is defined by a time period or duration (e.g., in seconds). Within each frame, the first and second phases may be consecutive and non-overlapping in time. During the first phase, which may occur for $T_l$ seconds, the first radar system 104 determines the direction-of-arrival and the power level of any received radio waves (e.g., the first radio wave RW1), and the power level of received signal energy within each sector of the first plurality of sectors S1-S6. Additionally, the first radar system 104 selects the first set of sectors (e.g., the second through fifth sectors S2-S5 or the third and fourth sectors S3 and S4) from the first plurality of sectors S1-S6 and prepares to generate the second radio wave RW2. Further, during the second phase, which may occur for $T_s$ seconds, the first radar system 104 broadcasts the second radio wave RW2, receives the third radio wave RW3, and generates the object data OD. The aforementioned broadcasting, receiving, and data generating operations are repeated multiple times during the second phase. Thus, during the first phase, the first radar system 104 checks for interference in the first operating beamwidth and adjusts the radio wave to be broadcasted based on the detected interference, and during the second phase, the adjusted radio wave is utilized for the object detection operation. The first phase may be referred to as a listening phase, and the second phase may be referred to as a broadcast phase.

When the trimmed radio wave is broadcasted continuously during the broadcast phases of a predefined number of frames (e.g., 5 frames, 10 frames, or some other predefined value), the first radar system 104 may be further configured to broadcast, for one or more subsequent frames, a fourth radio wave RW4 within both the unselected and selected sectors of the first plurality of sectors S1-S6, irrespective of a presence of an interfering radio wave in the first operating beamwidth. The broadcast of the fourth radio wave RW4 ensures that the second vehicle is detected by the first radar system 104. In other words, for some frames, the first radar system 104 broadcasts the trimmed radio wave (e.g., within the second through fifth sectors S2-S5 or the third and fourth sectors S3 and S4), but for other frames (e.g., occasionally or periodically), the first radar system 104 broadcasts a full, non-trimmed radio wave within all the first through sixth sectors S1-S6. The occasional or periodic broadcast of the fourth radio wave RW4 ensures that the object detection operation of the first radar system 104 is performed accurately.

The first radar system 104 may include a storage circuit (not shown) that may be configured to store reference data (not shown) associated with each frame. The reference data may be indicative of the beamwidth of the broadcasted radio wave during the corresponding frame. The first radar system 104 may broadcast the fourth radio wave RW4 when the reference data indicates that the trimmed radio wave has been broadcasted continuously for the predefined number of frames or for a predefined period of time or some other predefined criteria (e.g., detection of the second vehicle being within a particular distance from the first vehicle or having a particular relative velocity with respect to the first vehicle).

The second radar system 108 may operate in a similar manner as the first radar system 104. In an embodiment, each of the first and second radar systems 104 and 108 corresponds to a frequency-modulated continuous-wave (FMCW) radar system. The first radar system 104 is explained in detail in conjunction with FIGS. 2 and 3.

The first functional circuit 106 may be coupled to the first radar system 104. The first functional circuit 106 may include suitable circuitry that may be configured to perform one or more operations. For example, the first functional circuit 106 may be configured to receive the object data OD from the first radar system 104. Based on the object data OD, the first functional circuit 106 may be further configured to perform a set of functional operations associated therewith. In an example, if the distance of the object 110 from the first vehicle is less than a safety limit, the first functional circuit 106 may be configured to broadcast a warning to a driver of the first vehicle, and/or the first functional circuit 106 may be configured to adjust a velocity of the first vehicle by performing mechanical or engine braking. The second functional circuit may operate in a similar manner in conjunction with the second radar system 108.

Although FIG. 1 describes that each operating beamwidth includes six sectors, the scope of the present disclosure is not limited to it. In various other embodiments, each operating beamwidth may include less than or more than six sectors, without deviating from the scope of the present disclosure. Further, the number of sectors to be included in a trimmed radio wave may vary based on the power level of received signal energy within each sector.

The radar network 100 is illustrated to include two radar systems (e.g., the first and second radar systems 104 and 108) to make the illustrations concise and clear and should not be considered a limitation of the present disclosure. In various other embodiments, the radar network 100 may include more than two radar systems, without deviating from the scope of the present disclosure.

Figure 2:
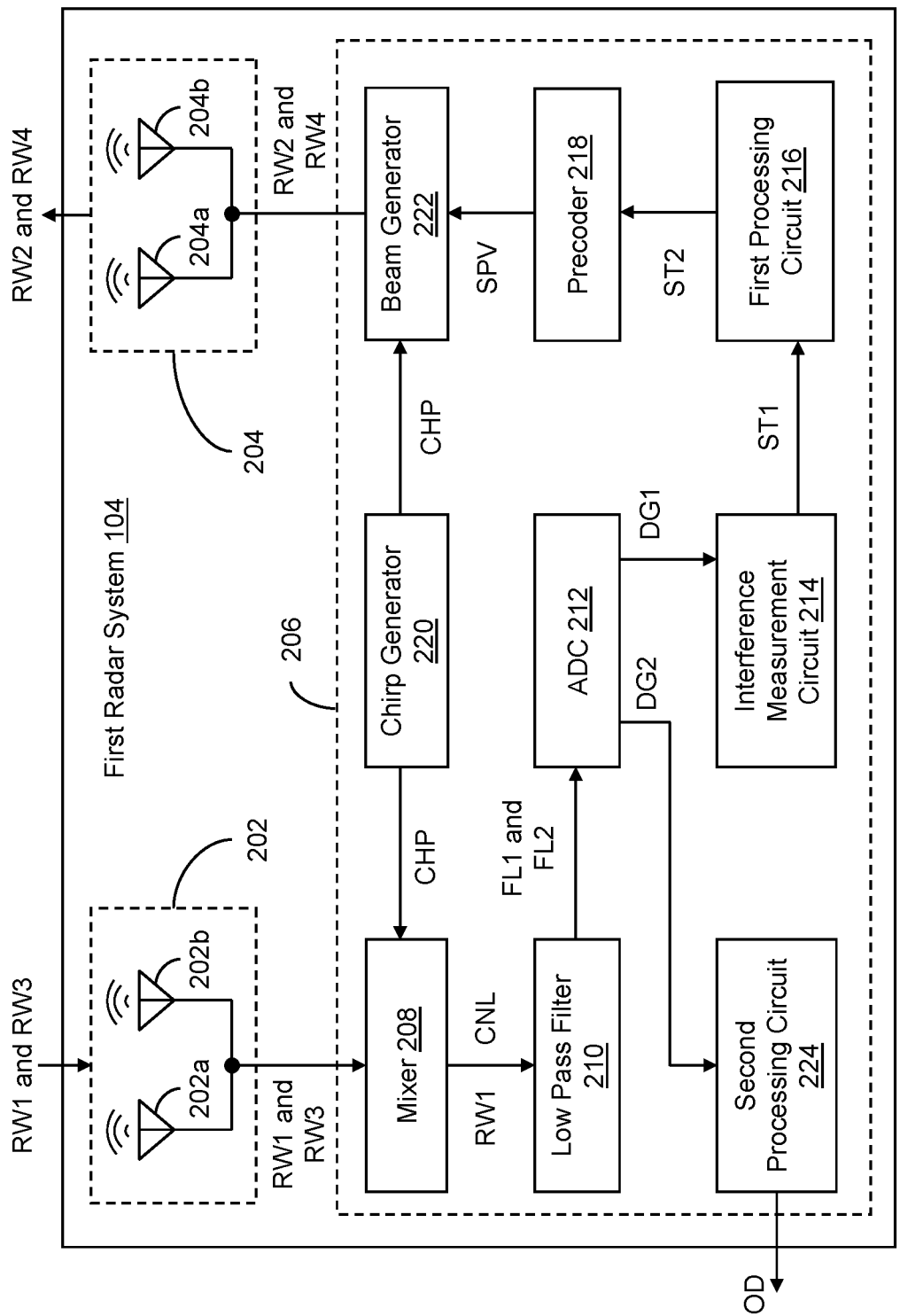
FIG. 2 illustrates a schematic block diagram of a first radar system of the radar network of FIG. 1 in accordance with an embodiment of the present disclosure.

FIG. 2 illustrates a schematic block diagram of the first radar system 104 in accordance with an embodiment of the present disclosure. The first radar system 104 may include a first plurality of antennas 202, a second plurality of antennas 204, and a controller 206.

The first plurality of antennas 202 may be configured to receive the first radio wave RW1 in the first operating beamwidth of the first radar system 104. Further, the first plurality of antennas 202 may be configured to facilitate the reception of the third radio wave RW3 that is reflected from the object 110. On the other hand, the second plurality of antennas 204 may be configured to facilitate the broadcast of the second and fourth radio waves RW2 and RW4. In an embodiment, the first plurality of antennas 202 may include a first antenna 202a and a second antenna 202b, and the second plurality of antennas 204 may include a third antenna 204a and a fourth antenna 204b.

The controller 206 may be coupled to the first and second pluralities of antennas 202 and 204, the memory, and the first functional circuit 106. The controller 206 may be configured to receive the first radio wave RW1 using the first plurality of antennas 202, and determine the direction-of-arrival and the power level of the first radio wave RW1. Based on the direction-of-arrival and the power level of the first radio wave RW1, the controller 206 may be further configured to determine the power level of received signal energy within each sector of the first plurality of sectors S1-S6. Further, the controller 206 may be configured to retrieve the first through sixth threshold values from the memory to compare the power levels of received signal energy within the first through sixth sectors S1-S6 with the first through sixth threshold values, respectively. The controller 206 may be further configured to select, from the first plurality of sectors S1-S6, the first set of sectors (e.g., the second through fifth sectors S2-S5 or the third and fourth sectors S3 and S4) such that the power level of received signal energy within each sector of the first set of sectors is less than the threshold value of the corresponding sector. The controller 206 may be further configured to broadcast the second radio wave RW2 within the first set of sectors using the second plurality of antennas 204 to mitigate the interference of the first radio wave RW1. In other words, the first and second radio waves RW1 and RW2 do not overlap, and hence, the operations of the first and second radar systems 104 and 108 remain unaffected by potential interference.

The controller 206 may be further configured to receive the third radio wave RW3 using the first plurality of antennas 202. The third radio wave RW3 corresponds to the second radio wave RW2 that is reflected from the object 110. Based on the second and third radio waves RW2 and RW3, the controller 206 may be further configured to determine the distance, the direction, and the velocity of the object 110 with respect to the first radar system 104, and generate the object data OD. The controller 206 may be further configured to provide the object data OD to the first functional circuit 106.

The controller 206 determines the direction-of-arrival and the power level of the first radio wave RW1 and the power level of received signal energy within each sector of the first plurality of sectors S1-S6, and selects the first set of sectors (e.g., the second through fifth sectors S2-S5 or the third and fourth sectors S3 and S4) during the first phase (e.g., the listening phase) of one frame associated with the first radar system 104. Further, during the second phase (e.g., the broadcast phase), the controller 206 broadcasts the second radio wave RW2, receives the third radio wave RW3, and generates the object data OD. When the trimmed radio wave (e.g., the second radio wave RW2) has been broadcasted continuously for the predefined number of frames or the predefined period of time, the controller 206 may be further configured to broadcast, for one or more subsequent frames, the fourth radio wave RW4 within the first plurality of sectors S1-S6 using the second plurality of antennas 204. The controller 206 may include a mixer 208, a low pass filter 210, an analog-to-digital converter (ADC) 212, an interference measurement circuit 214, a first processing circuit 216, a precoder 218, a chirp generator 220, a beam generator 222, and a second processing circuit 224.

The mixer 208 may be coupled to the first plurality of antennas 202, the chirp generator 220, and the low pass filter 210. The mixer 208 may include suitable circuitry that may be configured to perform one or more operations. For example, the mixer 208 may be configured to receive the first and third radio waves RW1 and RW3 using the first plurality of antennas 202. As the first radio wave RW1 is indicative of the interference associated with the first radar system 104, the mixer 208 may be further configured to provide a converted version of the first radio wave RW1 to the low pass filter 210. On the other hand, the third radio wave RW3 corresponds to the second radio wave RW2 that is reflected from the object 110. In such a scenario, the mixer 208 may be further configured to receive a chirp signal CHP from the chirp generator 220. The chirp signal CHP may be utilized in the broadcast of the second radio wave RW2. The mixer 208 may be further configured to generate a control signal CNL based on the chirp signal CHP and the third radio wave RW3. The control signal CNL may be indicative of the time duration between the broadcast of the second radio wave RW2 and the reception of the third radio wave RW3. In an example, a frequency of the control signal CNL may be indicative of the time duration between the broadcast of the second radio wave RW2 and the reception of the third radio wave RW3. The mixer 208 may be further configured to provide the control signal CNL to the low pass filter 210.

The low pass filter 210 may include suitable circuitry that may be configured to perform one or more operations. For example, during the listening phase, the low pass filter 210 may be configured to receive the first radio wave RW1 (e.g., the converted first radio wave RW1) from the mixer 208, and generate a first filtered signal FL1. The first filtered signal FL1 is a filtered version of the first radio wave RW1 and is generated by filtering a predefined range of frequencies from the first radio wave RW1. Similarly, during the broadcast phase, the low pass filter 210 may be configured to receive the control signal CNL from the mixer 208, and generate a second filtered signal FL2 as a filtered version of the control signal CNL.

The ADC 212 may be coupled to the low pass filter 210, the interference measurement circuit 214, and the second processing circuit 224. The ADC 212 may include suitable circuitry that may be configured to perform one or more operations. For example, during the listening phase, the ADC 212 may be configured to receive the first filtered signal FL1 from the low pass filter 210, and generate a first digital signal DG1 that is a digital version of the first filtered signal FL1. Further, the ADC 212 may be configured to provide the first digital signal DG1 to the interference measurement circuit 214. Similarly, during the broadcast phase, the ADC 212 may be configured to receive the second filtered signal FL2 from the low pass filter 210, and generate a second digital signal DG2 that is a digital version of the second filtered signal FL2. Further, the ADC 212 may be configured to provide the second digital signal DG2 to the second processing circuit 224.

The second processing circuit 224 may be coupled to the first functional circuit 106. The second processing circuit 224 may include suitable circuitry that may be configured to perform one or more operations. For example, during the broadcast phase, the second processing circuit 224 may be configured to receive the second digital signal DG2 from the ADC 212. The second processing circuit 224 may be further configured to process the second digital signal DG2 and determine the distance, the direction, and the velocity of the object 110 with respect to the first radar system 104 based on the processing of the second digital signal DG2. The processing of the second digital signal DG2 may include the execution of various transformation operations (e.g., fast Fourier transform (FFT) operations) and various detection operations (e.g., constant false alarm rate (CFAR) operations). The second processing circuit 224 may be further configured to generate the object data OD that is indicative of the distance, the direction, and the velocity of the object 110 with respect to the first radar system 104 and provide the object data OD to the first functional circuit 106. Further, during the listening phase, the second processing circuit 224 may be non-operational.

The interference measurement circuit 214 may include suitable circuitry that may be configured to perform one or more operations. For example, during the listening phase, the interference measurement circuit 214 may be configured to receive the first digital signal DG1 from the ADC 212. The first digital signal DG1 is derived from the first radio wave RW1 as described above. Based on the first digital signal DG1, the interference measurement circuit 214 may be further configured to determine the direction-of-arrival and the power level of the first radio wave RW1. The interference measurement circuit 214 may be further configured to generate first status data ST1 that is indicative of the direction-of-arrival and the power level of the first radio wave RW1. Further, during the broadcast phase, the interference measurement circuit 214 may be non-operational.

The first processing circuit 216 may be coupled to the interference measurement circuit 214 and the memory. The first processing circuit 216 may include suitable circuitry that may be configured to perform one or more operations. For example, during the listening phase, the first processing circuit 216 may be configured to receive the first status data ST1 from the interference measurement circuit 214 and process the first status data ST1. Based on the processing of the first status data ST1, the first processing circuit 216 may be further configured to determine the power level of received signal energy within each sector of the first plurality of sectors S1-S6. The first processing circuit 216 may be further configured to retrieve the first through sixth threshold values from the memory and compare the power levels of received signal energy within the first through sixth sectors S1-S6 with the first through sixth threshold values, respectively. The first processing circuit 216 may be further configured to select the first set of sectors (e.g., the second through fifth sectors S2-S5 or the third and fourth sectors S3 and S4) from the first plurality of sectors S1-S6 and generate second status data ST2 that is indicative of the first set of sectors. Further, during the broadcast phase, the first processing circuit 216 may be non-operational.

The precoder 218 may be coupled to the first processing circuit 216 and the beam generator 222. The precoder 218 may include suitable circuitry that may be configured to perform one or more operations. For example, during the listening phase, the precoder 218 may be configured to receive the second status data ST2 from the first processing circuit 216. The precoder 218 may be further configured to convert the second status data ST2 to a set of precoded values SPV to adjust the first operating beamwidth, and provide the set of precoded values SPV to the beam generator 222. Further, during the broadcast phase, the precoder 218 may be non-operational.

The chirp generator 220 may be coupled to the mixer 208 and the beam generator 222. The chirp generator 220 may include suitable circuitry that may be configured to perform one or more operations. For example, the chirp generator 220 may be configured to generate the chirp signal CHP and provide the chirp signal CHP to the mixer 208 and the beam generator 222. The chirp signal CHP may be generated during the listening phase for the broadcast of the second radio wave RW2 in the broadcast phase. The chirp signal CHP may be utilized by the beam generator 222 to generate the second radio wave RW2. Further, the chirp signal CHP may be utilized by the mixer 208, in conjunction with the third radio wave RW3, to generate the control signal CNL. The distance, the direction, and the velocity of the object 110 with respect to the first radar system 104 may thus be determined based on the second and third radio waves RW2 and RW3.

The beam generator 222 may be coupled to the precoder 218, the chirp generator 220, and the second plurality of antennas 204. The beam generator 222 may include suitable circuitry that may be configured to perform one or more operations. For example, during the listening phase, the beam generator 222 may be configured to receive the chirp signal CHP and the set of precoded values SPV from the chirp generator 220 and the precoder 218, respectively. Based on the chirp signal CHP and the set of precoded values SPV, the beam generator 222 may be further configured to generate the second radio wave RW2. Further, during the broadcast phase, the beam generator 222 may be configured to broadcast, based on the chirp signal CHP and the set of precoded values SPV, the second radio wave RW2 within the first set of sectors (e.g., the second through fifth sectors S2-S5 or the third and fourth sectors S3 and S4) to mitigate the interference of the first radio wave RW1. The beam generator 222 may broadcast the second radio wave RW2 to the radar network 100 using the second plurality of antennas 204.

When the second radio wave RW2 is broadcasted continuously for the predefined number of frames or the predefined period of time, the beam generator 222 may be further configured to broadcast, for one or more subsequent frames, the fourth radio wave RW4 within the first plurality of sectors S1-S6. The beam generator 222 may generate the fourth radio wave RW4 based on the chirp signal CHP. Further, the beam generator 222 may be configured to broadcast the fourth radio wave RW4 using the second plurality of antennas 204. The beam generator 222 may be coupled to the storage circuit that may store the reference data associated with each frame. The beam generator 222 may generate the fourth radio wave RW4 when the reference data indicates that the trimmed radio wave has been broadcasted continuously for the predefined number of frames or the predefined period of time.

In operation, when the first radio wave RW1 is broadcasted by the second radar system 108, the first plurality of antennas 202 may receive the first radio wave RW1 in the first operating beamwidth. The low pass filter 210 may generate the first filtered signal FL1 as the filtered version of the first radio wave RW1, and the ADC 212 may generate the first digital signal DG1 as the digital version of the first filtered signal FL1. The interference measurement circuit 214 may determine the direction-of-arrival and the power level of the first radio wave RW1 based on the first digital signal DG1, and generate the first status data ST1 indicative of the direction-of-arrival and the power level of the first radio wave RW1. The first processing circuit 216 may process the first status data ST1 and determine the power level of received signal energy within each sector of the first plurality of sectors S1-S6. Further, the first processing circuit 216 may select the first set of sectors (e.g., the second through fifth sectors S2-S5 or the third and fourth sectors S3 and S4) from the first plurality of sectors S1-S6, and generate the second status data ST2 indicative of the first set of sectors.

The precoder 218 may convert the second status data ST2 to the set of precoded values SPV. Further, the chirp generator 220 may generate the chirp signal CHP. Based on the chirp signal CHP and the set of precoded values SPV, the beam generator 222 may generate and broadcast the second radio wave RW2 within the first set of sectors (e.g., the second through fifth sectors S2-S5 or the third and fourth sectors S3 and S4) to the radar network 100 using the second plurality of antennas 204. Thus, in the first radar system 104, the interference is detected and controlled in a spatial domain.

The second radio wave RW2 may be reflected from the object 110 and the third radio wave RW3 (e.g., the reflected second radio wave RW2) may be received by the mixer 208 using the first plurality of antennas 202. The mixer 208 may further receive the chirp signal CHP from the chirp generator 220. In such a scenario, the mixer 208 may generate the control signal CNL based on the chirp signal CHP and the third radio wave RW3. The control signal CNL may be indicative of the time duration between the broadcast of the second radio wave RW2 and the reception of the third radio wave RW3. The low pass filter 210 may generate the second filtered signal FL2 as the filtered version of the control signal CNL, and the ADC 212 may generate the second digital signal DG2 as the digital version of the second filtered signal FL2. The interference measurement circuit 214, the first processing circuit 216, and the precoder 218 may be non-operational when the third radio wave RW3 is received by the first radar system 104. In an embodiment, the controller 206 may further include an activation circuit (not shown) that may control the activation and deactivation of various components (e.g., the interference measurement circuit 214, the first processing circuit 216, and the precoder 218) of the controller 206.

The second processing circuit 224 may process the second digital signal DG2 and determine the distance, the direction, and the velocity of the object 110 with respect to the first radar system 104. Further, the second processing circuit 224 may generate the object data OD that is indicative of the distance, the direction, and the velocity of the object 110 with respect to the first radar system 104, and provide the object data OD to the first functional circuit 106.

When each radar system in the radar network 100 operates in an above-described manner, the interference for each radar system may be mitigated (e.g., reduced or eliminated).

Although the first and second pluralities of antennas 202 and 204 are shown to include two antennas each, the scope of the present disclosure is not limited to it. In various other embodiments, each of the first and second pluralities of antennas 202 and 204 may include more than two antennas, without deviating from the scope of the present disclosure.

Figure 3:
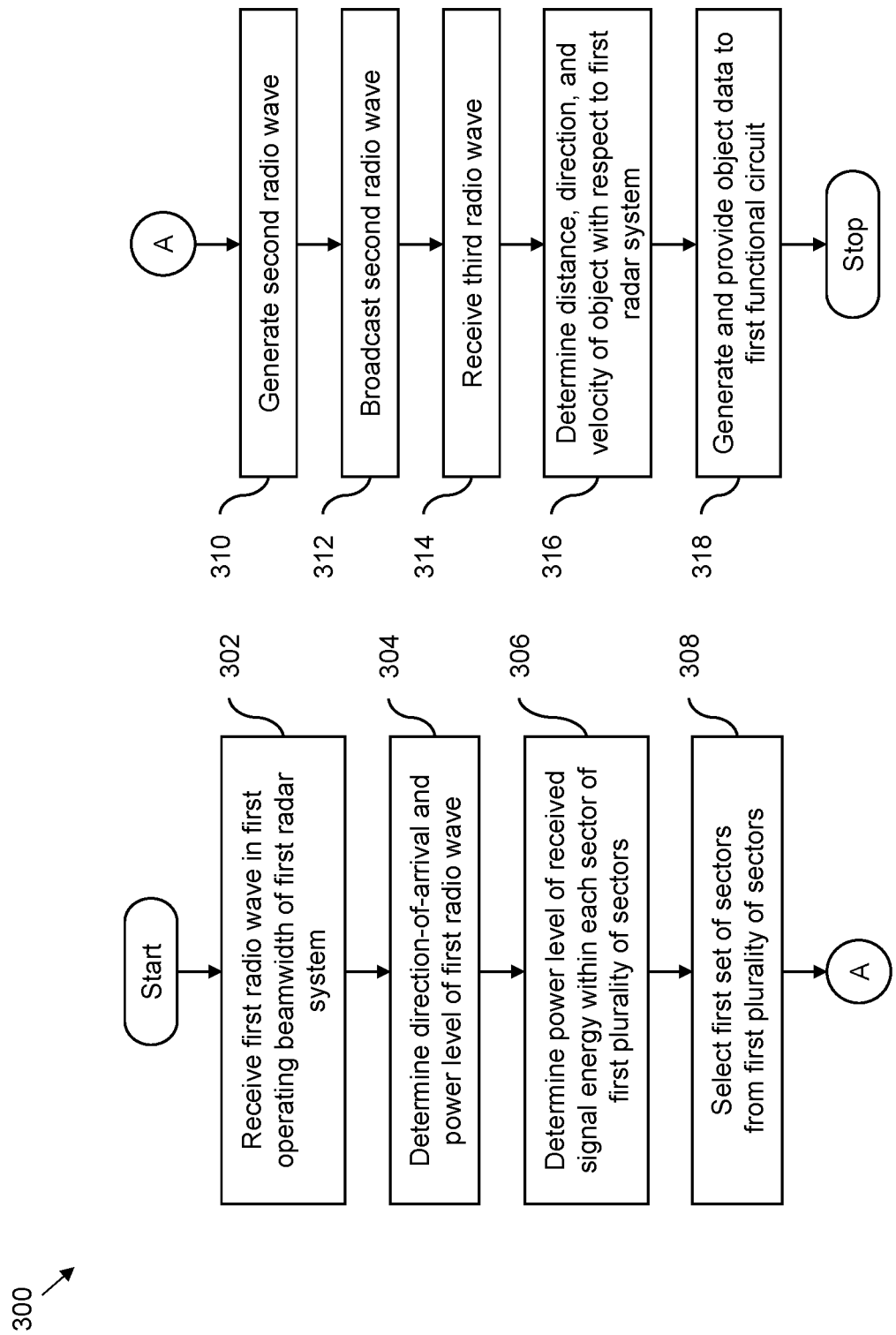
FIG. 3 represents a flowchart that illustrates an interference mitigation method in accordance with an embodiment of the present disclosure.

FIG. 3 represents a flowchart 300 that illustrates an interference mitigation method in accordance with an embodiment of the present disclosure. The interference mitigation method may be performed by the first radar system 104 to mitigate the interference therein. At step 302, the first plurality of antennas 202 of the first radar system 104 may receive the first radio wave RW1 in the first operating beamwidth of the first radar system 104. At step 304, the controller 206 of the first radar system 104 may determine the direction-of-arrival and the power level of the first radio wave RW1. At step 306, the controller 206 may determine the power level of received signal energy within each sector of the first plurality of sectors S1-S6. The controller 206 may determine the power level of received signal energy within each sector of the first plurality of sectors S1-S6 based on the direction-of-arrival and the power level of the first radio wave RW1.

At step 308, the controller 206 may select the first set of sectors (e.g., the second through fifth sectors S2-S5 or the third and fourth sectors S3 and S4) from the first plurality of sectors S1-S6. To select the first set of sectors, the controller 206 may retrieve the first through sixth threshold values from the memory and compare the power levels of received signal energy within the first through sixth sectors S1-S6 with the first through sixth threshold values, respectively. The first set of sectors is selected such that the power level of received signal energy within each sector of the first set of sectors is less than the threshold value of the corresponding sector. At step 310, the controller 206 may generate the second radio wave RW2 to be broadcast within the first set of sectors (e.g., the second through fifth sectors S2-S5 or the third and fourth sectors S3 and S4). At step 312, the controller 206 may broadcast the second radio wave RW2 using the second plurality of antennas 204 of the first radar system 104.

At step 314, the controller 206 may receive the third radio wave RW3 using the first plurality of antennas 202. The third radio wave RW3 corresponds to the second radio wave RW2 that is reflected from the object 110. At step 316, the controller 206 may determine the distance, the direction, and the velocity of the object 110 with respect to the first radar system 104 based on the second and third radio waves RW2 and RW3. At step 318, the controller 206 may generate the object data OD that is indicative of the distance, the direction, and the velocity of the object 110 with respect to the first radar system 104 and provide the object data OD to the first functional circuit 106.

The second radio wave RW2 may be broadcasted continuously for the predefined number of frames or the predetermined period of time. In such a scenario, for one or more subsequent frames, the fourth radio wave RW4 is broadcasted within the first plurality of sectors S1-S6 to ensure that the second vehicle is detected by the first radar system 104 (e.g., is not missed as a result of persistently adjusted beamwidth).

In summary, in a radar network that includes multiple radar systems (or "radars"), each radar in the network listens to the environment for $T_l$ seconds and broadcasts for $T_s$ seconds. During the listening period of $T_l$ seconds, the radar determines if there is any other broadcast going on in the network in directions of interest. Let $\theta_{bw}$ be the beamwidth of the radar and let $\theta_{bw} = \theta_{-K} + \theta_{-K+1} + \theta_{-1} + \theta_1 \ldots + \theta_K$ (e.g., the beamwidth is divided into 2K sectors). The radar determines the received signal power in each sector and let $P_i$, i=-K, ... -1, 1, ... K, be the received power in $i^{\{th\}}$ sector. The received signal power in each sector is compared against a threshold, and based on whether the received power exceeds the threshold or not, the radar decides to change its beamwidth. In particular, let $T_i$, i=-K, ... -1, 1, ... K, be the 2K thresholds. Now, for example, if $P_K > T_K$ then the radar decides to not illuminate the sectors $\theta_K$ and $\theta_{-K}$. In this case, it forms a beam of width $\theta_{bw} = \theta_{-K+1} + \theta_{-1} + \theta_1 \ldots + \theta_{K-1}$ (e.g., the beamwidth is reduced by two sector angles). In general, if $P_i > T_i$, i>L then the broadcasted beam does not have the outermost 2L sectors. If an inner sector power alone exceeds the threshold but not an adjacent outer sector, then the radar decides to reduce its beamwidth based on the difference in $P_i$ and $T_i$. Moreover, the beamwidth is changed with a probability p and for N consecutive frames to ensure that the interferer is also illuminated with probability 1-p.

Conventionally, a radar system checks for interference prior to broadcasting the radio waves and if the interference is detected, the radar system halts the broadcast of the radio waves to mitigate (e.g., reduce or eliminate) the interference. Implementation of such an interference mitigation technique may lead to a failure in an object detection operation if the interference persists for a significant time duration. Further, the interference mitigation technique is implemented in time and frequency domains which require various transformation operations that result in a significant increase in the design complexity of the radar system.

In an radar system of the present disclosure (e.g., the first and second radar systems 104 and 108), the detection of an interfering radio wave (e.g., the first radio wave RW1) in an operating beamwidth thereof results in the generation of a trimmed radio wave (e.g., the second radio wave RW2). The broadcast of such a trimmed radio wave mitigates the interference for the broadcasting radar system (e.g., the first radar system 104) as well as the interfering radar system (e.g., the second radar system 108). Hence, the reliability of object detection in an interference mitigation technique implemented by the radar system of the present disclosure is significantly greater than that in a conventional interference mitigation technique where the broadcast of radio waves is halted when the interference is detected. Further, the radar system of the present disclosure detects the interference in the spatial domain and mitigates the interference in the spatial domain by reducing a beamwidth of a radio wave that is to be broadcasted. Thus, the interference mitigation technique implemented by the radar system of the present disclosure is sans transformation operations. As a result, the design complexity of the radar system of the present disclosure is significantly less than that of an radar system that implements the conventional interference mitigation technique.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A radio detection and ranging (radar) system, comprising:
    a first plurality of antennas configured to receive a first radio wave in an operating beamwidth of the radar system, wherein the operating beamwidth is divided into a plurality of sectors; and
    a controller that is coupled to the first plurality of antennas, and configured to:
        determine a direction-of-arrival and a power level of the first radio wave;
        determine, based on the direction-of-arrival and the power level of the first radio wave, a power level of received signal energy within each sector of the plurality of sectors;
        select, from the plurality of sectors, a first set of sectors such that a power level of received signal energy within each sector of the first set of sectors is less than a threshold value of the corresponding sector, wherein the first set of sectors includes fewer than all of the plurality of sectors; and
        broadcast a second radio wave within only the first set of sectors.

2. The radar system of claim 1, wherein the controller comprises a first processing circuit that is configured to:
    receive first status data that is indicative of the direction-of-arrival and the power level of the first radio wave;
    process the first status data;
    determine, based on the processing of the first status data, the power level of received signal energy within each sector of the plurality of sectors;
    select the first set of sectors from the plurality of sectors such that the power level of received signal energy within each sector of the first set of sectors is less than the threshold value of the corresponding sector; and
    generate second status data indicative of the first set of sectors.

3. The radar system of claim 2, wherein the controller further comprises an interference measurement circuit that is coupled to the first processing circuit, and configured to:
receive a first digital signal that is derived from the first radio wave;
determine, based on the first digital signal, the direction-of-arrival and the power level of the first radio wave; and
generate the first status data that is indicative of the direction-of-arrival and the power level of the first radio wave.

4. The radar system of claim 3, wherein the controller further comprises:
a low pass filter that is configured to receive the first radio wave and generate a first filtered signal as a filtered version of the first radio wave; and
an analog-to-digital converter that is coupled to the low pass filter and the interference measurement circuit, and configured to receive the first filtered signal and generate the first digital signal as a digital version of the first filtered signal.

5. The radar system of claim 2, wherein the controller further comprises a precoder that is coupled to the first processing circuit, and configured to:
receive the second status data from the first processing circuit; and
convert the second status data to a set of precoded values to adjust the operating beamwidth of the radar system.

6. The radar system of claim 5, wherein the controller further comprises:
a chirp generator configured to generate a chirp signal; and
a beam generator that is coupled to the precoder and the chirp generator, and configured to:
receive the set of precoded values from the precoder and the chirp signal from the chirp generator; and
broadcast, based on the set of precoded values and the chirp signal, the second radio wave within the first set of sectors to mitigate an interference of the first radio wave.

7. The radar system of claim 1, further comprising a second plurality of antennas coupled to the controller, wherein the controller broadcasts the second radio wave using the second plurality of antennas.

8. The radar system of claim 1, wherein the controller is further configured to receive a third radio wave using the first plurality of antennas, wherein the third radio wave corresponds to the second radio wave that is reflected from an object that is in a vicinity of the radar system, and wherein the controller is further configured to determine, based on the third radio wave and the second radio wave, a distance, a direction, and a velocity of the object with respect to the radar system.

9. The radar system of claim 8, wherein the controller comprises a mixer that is coupled to the first plurality of antennas, and configured to:
receive the third radio wave;
receive a chirp signal that is utilized in the broadcast of the second radio wave; and
generate a control signal based on the third radio wave and the chirp signal, wherein the control signal is indicative of a time duration between the broadcast of the second radio wave and the reception of the third radio wave.

10. The radar system of claim 9, wherein the controller further comprises a chirp generator that is coupled to the mixer, and configured to generate the chirp signal and provide the chirp signal to the mixer, and wherein the chirp signal is generated for the broadcast of the second radio wave.

11. The radar system of claim 9, wherein the controller further comprises:
a low pass filter that is coupled to the mixer, and configured to receive the control signal and generate a second filtered signal as a filtered version of the control signal;
an analog-to-digital converter that is coupled to the low pass filter, and configured to receive the second filtered signal and generate a second digital signal as a digital version of the second filtered signal; and
a second processing circuit that is coupled to the analog-to-digital converter, and configured to receive the second digital signal, process the second digital signal, and determine, based on the processing of the second digital signal, the distance, the direction, and the velocity of the object with respect to the radar system.

12. The radar system of claim 1, wherein a frame associated with the radar system is divided into a first phase and a second phase, wherein during the first phase, the controller (i) determines the direction-of-arrival and the power level of the first radio wave, (ii) determines the power level of received signal energy within each sector of the plurality of sectors, and (iii) selects the first set of sectors from the plurality of sectors, and wherein during the second phase, the controller broadcasts the second radio wave within the first set of sectors.

13. The radar system of claim 1, wherein when the second radio wave is broadcasted for a predefined number of frames associated with the radar system, the controller is further configured to broadcast, during a subsequent frame, a third radio wave within the plurality of sectors.

14. The radar system of claim 1, wherein the first set of sectors is spatially contiguous.

15. The radar system of claim 1, wherein the plurality of sectors comprises the first set of sectors and a second set of sectors, wherein the second set of sectors comprises (i) a first sector and (ii) a second sector that is associated with and distant from the first sector, and wherein a power level of received signal energy within at least one of a group consisting of the first sector and the second sector is greater than or equal to an associated threshold value.

16. A method for interference mitigation in a radio detection and ranging (radar) system, the method comprising:
receiving, by a first plurality of antennas of the radar system, a first radio wave in an operating beamwidth of the radar system, wherein the operating beamwidth is divided into a plurality of sectors;
determining, by a controller of the radar system, a direction-of-arrival and a power level of the first radio wave;
determining, by the controller, based on the direction-of-arrival and the power level of the first radio wave, a power level of received signal energy within each sector of the plurality of sectors;
selecting, by the controller, from the plurality of sectors, a first set of sectors such that a power level of received signal energy within each sector of the first set of sectors is less than a threshold value of the corresponding sector, wherein the first set of sectors includes fewer than all of the plurality of sectors; and
broadcasting, by the controller, a second radio wave within only the first set of sectors.

17. The method of claim 16, further comprising:
receiving, by the controller, a third radio wave, wherein the third radio wave corresponds to the second radio wave that is reflected from an object that is in a vicinity of the radar system; and
determining, by the controller, based on the third radio wave and the second radio wave, a distance, a direction, and a velocity of the object with respect to the radar system.

18. The method of claim 16, wherein a frame associated with the radar system is divided into a first phase and a second phase, wherein during the first phase, (i) the direction-of-arrival and the power level of the first radio wave and the power level of received signal energy within each sector of the plurality of sectors are determined by the controller, and (ii) the first set of sectors is selected from the plurality of sectors by the controller, and wherein during the second phase, the second radio wave is broadcasted by the controller.

19. The method of claim 16, wherein the first set of sectors is spatially contiguous.

20. The method of claim 16, wherein the plurality of sectors comprises the first set of sectors and a second set of sectors, wherein the second set of sectors comprises (i) a first sector and (ii) a second sector that is associated with and distant from the first sector, and wherein a power level of received signal energy within at least one of a group consisting of the first sector and the second sector is greater than or equal to an associated threshold value.

* * * * *